United States Patent [19]

Kubo

[11] Patent Number: 5,748,725
[45] Date of Patent: May 5, 1998

[54] TELEPHONE SET WITH BACKGROUND NOISE SUPPRESSION FUNCTION

[75] Inventor: Masato Kubo, Tokyo, Japan

[73] Assignee: NEC Corporation, Tokyo, Japan

[21] Appl. No.: 359,516

[22] Filed: Dec. 20, 1994

[30] Foreign Application Priority Data

Dec. 29, 1993 [JP] Japan ................................ 5-353601

[51] Int. Cl.$^6$ ........................... H04M 1/00; G10K 11/16
[52] U.S. Cl. ...................... 379/387; 379/389; 379/406; 379/410; 381/71; 381/94
[58] Field of Search ........................... 379/387, 390, 379/395, 402, 406, 407, 410, 411, 419, 433; 381/83, 92, 93, 94, 107, 104, 71

[56] References Cited

U.S. PATENT DOCUMENTS

| | | | |
|---|---|---|---|
| 5,121,426 | 6/1992 | Baumhauer, Jr. et al. | 379/388 |
| 5,251,263 | 10/1993 | Andrea et al. | 381/71 |
| 5,323,458 | 6/1994 | Park et al. | 379/410 |
| 5,381,473 | 1/1995 | Andrea et al. | 379/395 |
| 5,521,263 | 5/1996 | Andrea et al. | 381/71 |

FOREIGN PATENT DOCUMENTS

| | | |
|---|---|---|
| 0 390 386 | 10/1990 | European Pat. Off. . |
| 0 461 801 | 12/1991 | European Pat. Off. . |
| 0 468 610 | 1/1992 | European Pat. Off. . |
| 89-093244 | 12/1989 | Japan . |
| 92 05538 | 4/1992 | WIPO . |

*Primary Examiner*—Jeffery Hofsass
*Assistant Examiner*—Jacques M. Saint-Surin
*Attorney, Agent, or Firm*—Laff, Whitesel, Conte & Saret, Ltd.

[57] ABSTRACT

A telephone set is provided with a first microphone at the position close to a speaker and a signal including remaining noise is outputted from the first microphone. Background noise is outputted from a second microphone. A noise elimination circuit estimates background noise reaching the ear of a receiver based on the background noise signal, the signal including the remaining noise, and a received voice signal from a transmitter. Also, the noise elimination circuit subtracts the estimated background noise from the received voice signal to supply the resultant signal to the speaker.

3 Claims, 4 Drawing Sheets

TELEPHONE SET WITH BACKGROUND NOISE SUPPRESSION FUNCTION

BACKGROUND OF THE INVENTION

The present invention relates to a telephone set by which communication can be performed with a good quality under the circumstances easy to be influenced by background noise.

Conventionally, if a telephone set is used under the circumstances of the high level of background noise, the background noise leaks from a transmitter into a receiver as a side tone. As a result, this makes it difficult to listen to voice for a received voice signal from an opposite side (either the subscriber on the distant end of a telephone line or side tone from the local transmitter). In order to solve the problem, Publication of Japanese Unexamined Patent Application, JP-A-1-093244 (1989) discloses a telephone set having a side tone adjusting circuit. The telephone set includes a voice detecting circuit for detecting the level of a voice signal from a transmitter; the side tone adjusting circuit for controlling the level of the voice signal from the transmitter to supply to a receiver; and a control signal generating circuit for controlling the attenuation amount of the side tone adjusting circuit in accordance with the detected level in the voice detecting circuit.

In the telephone set, the attenuation amount of the side tone adjusting circuit is set to a great value while the telephone set is not in the transmitting state, so that it is prevented that it is difficult to listen to the received voice signal at the receiving side from the opposite side.

However, although the conventional telephone set can suppress the background noise which leaks from the transmitter into the receiver, it cannot suppress background noise which directly reaches the ear of a person at the receiving side.

SUMMARY OF THE INVENTION

An object of the present invention is to provide a telephone set in which background noise directly reaching the ear of a person at the receiving side can be suppressed.

According to the invention, there is provided a telephone set comprising:

a speaker for outputting a first voice signal;

a first microphone provided in the vicinity of the speaker, for generating a first voice band signal;

a second microphone for generating a second voice band signal including background noise; and a noise elimination circuit for estimating the background noise from the first voice band signal and the second voice band signal and subtracting the estimated background noise from a received voice signal from an opposite end to generate the first voice signal which is supplied to the speaker.

DESCRIPTION OF THE PREFERRED EMBODIMENTS

Figure 1:
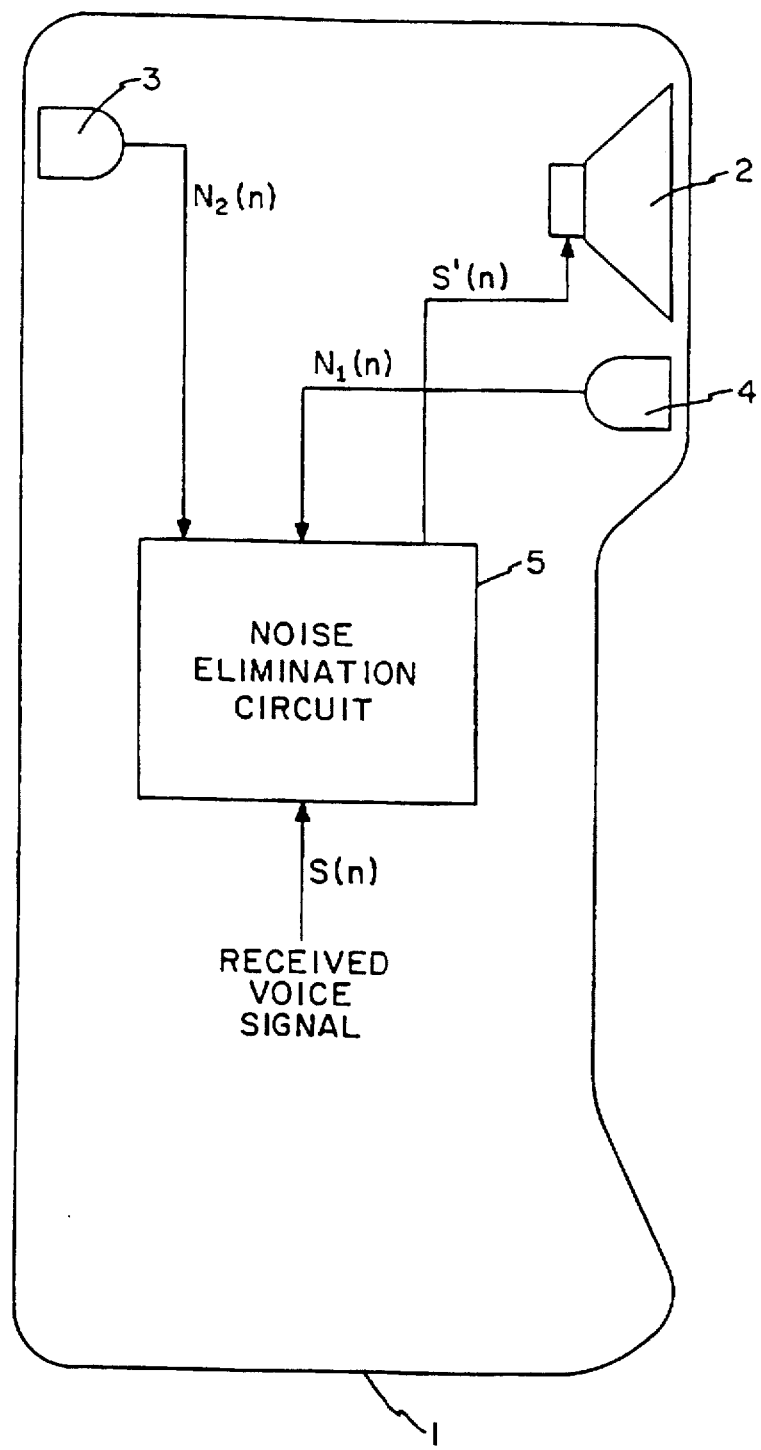
FIG. 1 is a block diagram showing a first embodiment of the present invention.

The first embodiment of the present invention will be described below with reference to FIG. 1. FIG. 1 is a block diagram showing the internal structure of circuits which are accommodated in a telephone set 1 according to the first embodiment of the present invention.

The first embodiment includes:

a reception speaker 2 for outputting a first voice signal S'(n) to an ear of a person at the receiver side;

a noise elimination error collecting microphone 4 provided in the vicinity of the reception speaker 2, for generating a first voice band signal $N_1(n)$ including a noise elimination error signal;

a background noise collecting microphone 3 provided at a position opposite to the reception speaker 2 in the telephone set 1, for collecting background noise to generate a second voice band signal $N_2(n)$; and a noise elimination circuit 5 for estimating the background noise which directly reaches to the ear of the person at the receiver side, based on the first voice band signal $N_1(n)$ from the noise elimination error collecting microphone 4 and the second voice band signal $N_2(n)$ from the background noise collecting microphone 3 and for subtracting the estimated value of background noise from a received voice signal S(n) from the opposite side to generate the first voice signal S'(n).

The first voice band signal $N_1(n)$ from the microphone 4 and the second voice band signal $N_2(n)$ from the microphone 3 are supplied to the noise elimination circuit 5. Also, the received voice signal S(n) from the opposite end is supplied to the noise elimination circuit 5.

As described later, the noise elimination circuit 5 includes an adaptive filter therein. The adaptive filter updates its tap coefficients based on the first voice bandwidth signal, i.e., the signal $N_1(n)$ including the noise elimination error signal, and filters the second voice bandwidth signal $N_2(n)$ using the tap coefficients to produce a replica of the background noise which directly reaches the ear of the receiver. The noise elimination circuit 5 subtracts the replica from the received voice signal from the opposite end to supply to the reception speaker 2 as the first voice signal S'(n).

As a result, the reception speaker 2 outputs voice obtained by converting the signal in which the replica of background noise is subtracted from the received voice signal from the opposite end. The voice reaches the ear of the person at the receiver side immediately after the voice is outputted from the speaker 2 as voice in which background noise is added. Therefore, the person at the receiver side can listen to the voice signal in which the background noise is canceled by the replica of background noise, that is, only the received voice signal S(n) from the opposite end and the noise elimination error signal.

Figure 2:
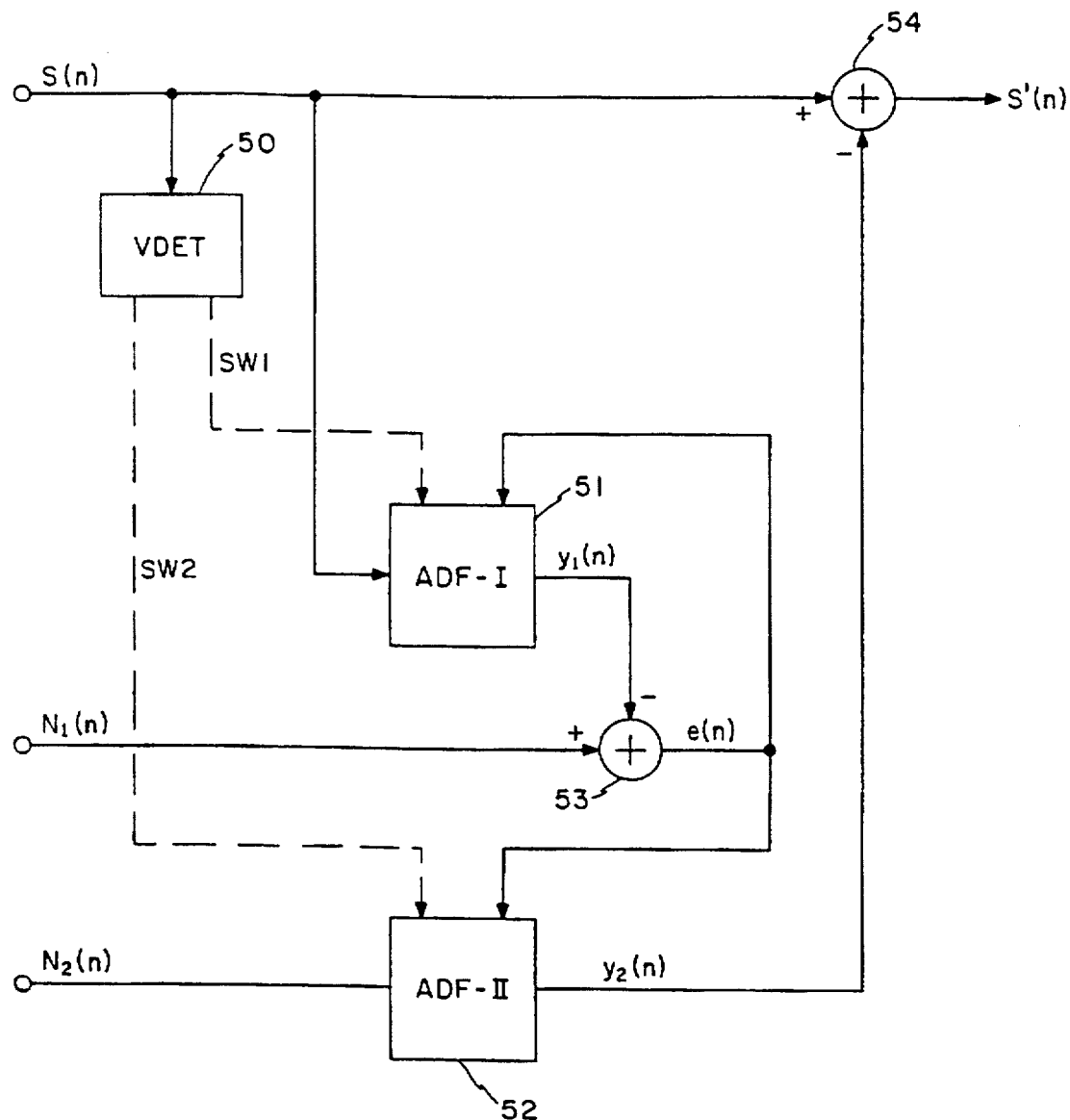
FIG. 2 is a block diagram showing the structure of a noise elimination circuit shown in FIG. 1.

Next, the internal structure and operation of the noise elimination circuit 5 will be described below in detail with reference to FIG. 2. As shown in FIG. 2, the noise elimination circuit includes:

a voice detector (VDET) 50 for detecting the level of a received voice signal S(n) to produce a control signal SW1 indicating that the detected level of the received voice signal is equal to or higher than a predetermined threshold level and a control signal SW2 indicating that the detected level of the received voice signal is lower than the predetermined threshold level;

a first adaptive filter(ADF-I) 51 supplied with the received voice signal S(n) from the opposite side and a noise elimination error signal e(n), for updating its tap coefficients when the control signal SW1 indicates that the detected level of the received voice signal is equal to or higher than the predetermined threshold level, and for filtering the received voice signal S(n) based on the tap coefficients to produce the replica of received voice signal $y_1(n)$;

a first subtracter 53 for subtracting the replica of received voice signal $y_1(n)$ from the first voice band signal $N_1(n)$ to produce the noise elimination error signal e(n);

a second adaptive filter(ADF-II) 52 supplied with the second voice band signal $N_2(n)$ and the noise elimination error signl e(n), for updating its tap coefficients when a control signal SW2 indicates that the detected level of the received voice signal S(n) is lower than the predetermined threshold level and filtering the second voice bandwidth signal $N_2(n)$ based on the tap coefficients to generate a replica of background noise $y_2(n)$; and a second subtracter 54 for subtracting the replica of background noise $y_2(n)$ from the received voice signal S(n) to supply the first voice signal to the reception speaker.

The voice detector 50 compares the level of the received voice signal S(n) with the predetermined value and outputs the control signal SW1 having a high level when the level is equal to or higher than the predetermined value. Also, the voice detector 50 output the control signal SW2 having the high level when the level of the received voice signal S(n) is smaller than the predetermined value.

The first adaptive filter 51 filters the received voice signal S(n) using the tap coefficients to produce the replica of received voice signal $y_1(n)$. The replica of received voice signal $y_1(n)$ is an estimated value of a signal which is outputted from the speaker 2 and collected by the microphone 3. This estimation is performed based on the processing shown by the following equation (1).

$$y_1(n) = \sum_{i=-L}^{L} c_i(n) \cdot S(n+i) \tag{1}$$

where $C_i(n)$ ($-L \leq i \leq L$) are the tap coefficients of the first adaptive filter at a time n, and (2L+1) is a number of taps. The replica of received voice signal $y_1(n)$ thus estimated is supplied to the first subtracter 53.

The first adaptive filter 51 also updates the tap coefficients based on, for example, the Least Mean Square (LMS) algorithm shown in the following equation (2) when the control signal SW1 is in the high level, that is, when the received voice signal S(n) exceeds the predetermined value.

$$c_i(n-1)=C_i(n)+2\mu_1 \cdot e(n) \; S(n) \tag{2}$$

where $\mu_1$ is a positive constant value.

Further, the first adaptive filter 51 stops the update of the tap coefficients when the control signal SW1 is in a low level.

The reason why the first adaptive filter 51 stops the update of the tap coefficients when the level of the received voice signal S(n) is smaller than the predetermined value is as follows. That is, as apparent from the equation (2), the updated amount of tap coefficient is dependent upon the magnitude of the received voice signal S(n). If the update of the tap coefficients is performed based on the equation (2) when the transmitter does not utter voice, the first adaptive filter performs the update of the tap coefficients based on not the received voice signal but noise included in the received voice signal. As a result of this, there can not be achieved sufficiently the essential object of the first adaptive filter that a signal outputted from the speaker 2 and collected by the microphone 3 is estimated. In order to prevent this, the first adaptive filter 51 stops the update of the tap coefficients when the level of the received voice signal fom the opposite side S(n) is small.

The first subtracter 53 subtracts the replica of received voice signal $y_1(n)$ from the first voice bandwidth signal $N_1(n)$ outputted from the microphone 4. As described above, since the first voice bandwidth signal includes the received voice signal outputted from the speaker 2 and collected by the microphone 3 and the noise elimination error signal, only the noise elimination error signal e(n) appears at the output of the subtracter 53. This noise elimination error signal is supplied to the first adaptive filter (ADF-I) 51 and the second adaptive filter (ADF-II).

The second adaptive filter 52 filters the second voice bandwidth signal $N_2(n)$ from the microphone 3 using the tap coefficients to produce the replica of background noise $y_2(n)$. The replica of background noise $y_2(n)$ is the estimated value of the background noise which directly reaches the ear of the person at the receiver side. The estimation is performed based on the processing shown by the following equation (3).

$$y_2(n) = \sum_{j=-M}^{M} d_j(n) \cdot N_2(n+j) \tag{3}$$

where $d_1(n)$ ($-M \leq j \leq M$) is the tap coefficient of the second adaptive filter at the time n, and (2M+1) shows a number of taps. The replica of background noise $y_2(n)$ thus estimated is supplied to the second subtracter 54.

The second adaptive filter 52 also updates the tap coefficients based on, for example, the Least Mean Square (LMS) algorithm shown in the following equation (4) when the control signal SW2 in the high level, that is, when the received voice signal S(n) is lower than the predetermined level. Further, the second adaptive filter 52 stops the update of the tap coefficients when the control signal SW2 is in a low level.

$$d_1(n+1)=d_1(n)+2\mu_2 \cdot e(n) \cdot N_2(n) \tag{4}$$

where $\mu_2$ is a positive constant value.

The reason why the second adaptive filter 52 stops the update of the tap coefficients when the level of the received voice signal S(n) is greater than the predetermined value is as follows. That is, as apparent from the equation (4), the updated amount of tap coefficient is dependent upon the magnitude of the second voice bandwidth signal $N_2(n)$. As described above, the second voice bandwidth signal $N_2(n)$ outputted from the microphone 3 includes the voice transmitted from the opposite side, outputted from the speaker 2, and collected by the microphone 3 in addition to the true background noise. If the update of the tap coefficients is performed when a person at the opposite end utters voice, the second adaptive filter 52 performs the update of the tap coefficients based on not only the second voice bandwidth signal but also the received voice signal. As a result of this, there can not be achieved sufficiently the essential object of the second adaptive filter that the background noise which directly reaches the ear of the receiver is estimated. In order to prevent this, the second adaptive filter 52 stops the update of the tap coefficients when the level of the received voice signal is great.

The second subtracter 54 subtracts the replica of background noise $y_2(n)$ from the received voice signal S(n). As a result, the signal obtained by adding the replica of background noise to the received voice signal S(n) is outputted from the subtracter 54 to the speaker 2. This polarity-inverted replica of background noise is canceled by the background noise which directly reaches the ear of the person at the receiver side.

In this manner, in the first embodiment, the communication having the good quality is made possible under the circumstances of the great magnitude of background noise by adding to the received voice signal the polarity-inverted estimated signal of background noise which directly reaches to the ear of the person at the receiver side.

The second embodiment of the present invention will be described below with reference to FIG. 3. In the first embodiment shown in FIG. 1, the noise elimination error microphone 4 is provided close to the reception speaker 2 in a lateral direction. For this reason, the receiving section of the telephone set including the speaker 2 becomes large in the first embodiment, so that the design of the outline of the telephone set is greatly constrained. In order to avoid the constraint, a speaker which has a small effective area of a vibration plate must be used as the reception speaker 2. Therefore, the quality of the received voice from the opposite end is degraded. Also, in the first embodiment, since the microphone 4 is provided at the lateral position of the reception speaker, the level of a signal outputted from the speaker 2 and then collected by the microphone 4 as the replica of background noise $y_2(n)$ is lower to the some extent than the signal level when the replica of background noise is received by the ear of the person at the receiver side. For this reason, the noise elimination error signal obtained from the microphone 4 is greater to the some extent than that at the ear of the person at the receiver side, so that the updated amount of tap coefficients of the adaptive filters 51 and 52 is inaccurate a little bit. The second embodiment of the present invention overcomes this problem.

Figure 3:
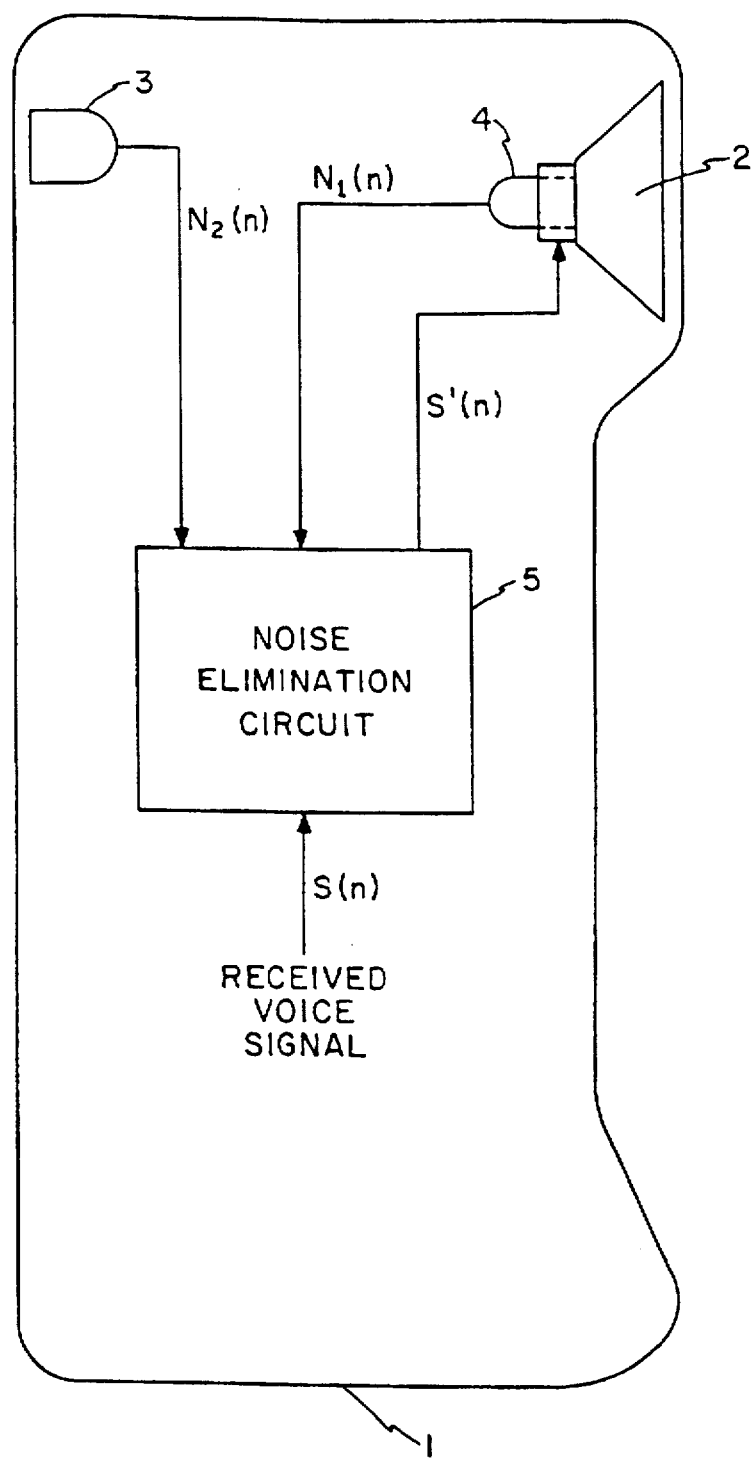
FIG. 3 is a block diagram showing a second embodiment of the present invention.

As seen from the comparison of FIG. 1 and FIG. 3, the difference between the first embodiment and the second embodiment lies in that the noise elimination error microphone 4 which is provided in a lateral direction of the reception speaker 2 in the first embodiment is provided on a concentric axis of the reception speaker 2 in the second embodiment.

In the second embodiment, the noise elimination error microphone 4 is arranged on the axis of the reception speaker 2 as a unit with the speaker 2 to constitute a speaker concentric type microphone. Therefore, the level of the replica of background noise is made to be the same as that at the ear of the person at the receiver side. A space occupied by the reception speaker and the microphone 4 is substantially the same as that of a telephone set having no background noise eliminating function. Thus, the constraint described in the above first embodiment can be overcome.

Figure 4:
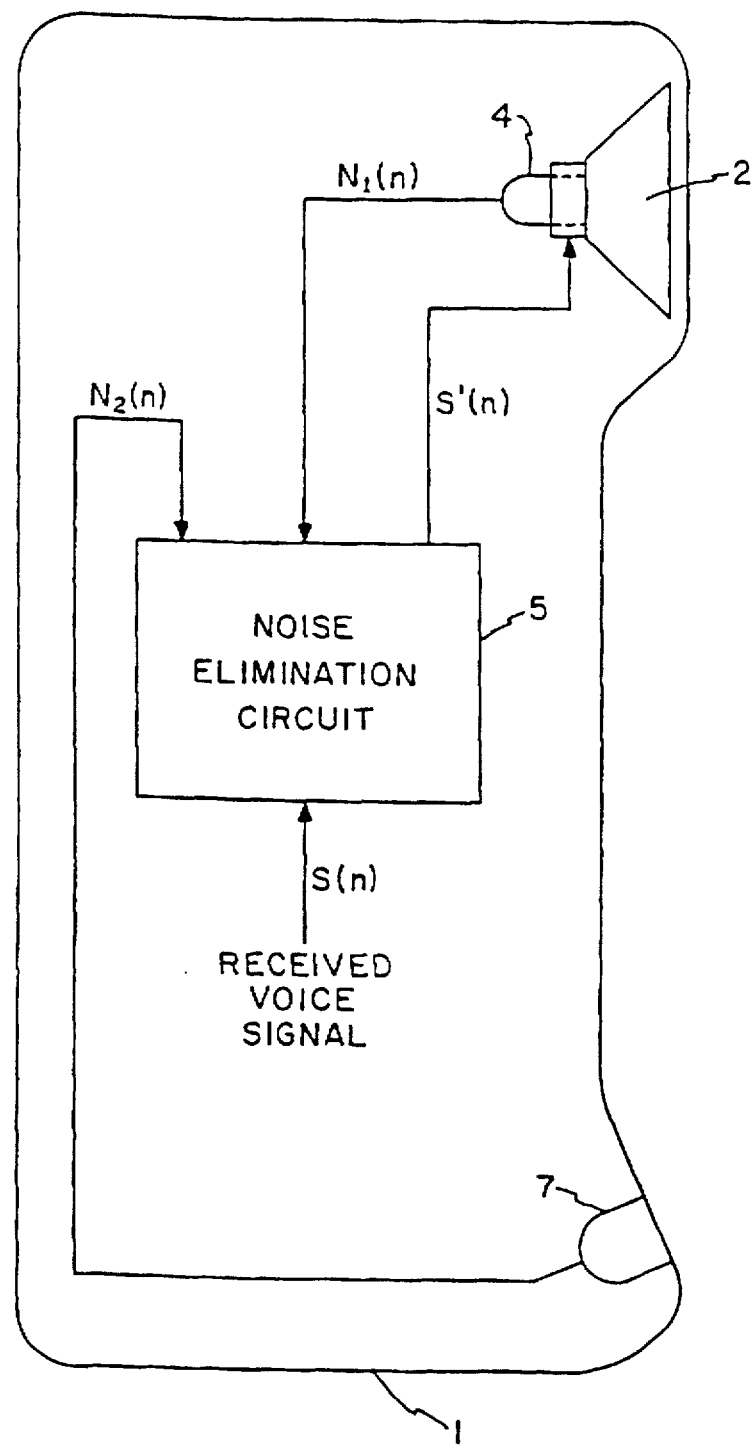
FIG. 4 is a block diagram showing a third embodiment of the present invention.

FIG. 4 shows the third embodiment of the present invention. In this embodiment, the background noise collecting microphone 3 is not provided unlike in the first and second embodiments. The transmission microphone 7 which is provided at the lower portion of the receiver 1 is used as the background noise collecting microphone. The background noise is collected by the transmission microphone and is supplied to the noise elimination circuit 5. In the third embodiment, the transmission microphone and the background noise collecting microphone are shared to reduce the number of parts.

As described above, the present invention provides a telephone set in which the background noise directly reaching the ear of the person at the receiver side is suppressed and the communication with good quality can be performed under the circumstances of great magnitude of background noise.

I claim:

1. A telephone set for suppressing background noise comprising:

a speaker for outputting a first voice signal;

a first microphone provided in the vicinity of said speaker, for generating a first voice band signal;

a second microphone for generating a second voice band signal including said background noise;

said noise elimination circuit comprising:

a level detector for comparing said received voice signal with a predetermined threshold value to output a control signal indicative of whether said received voice signal is equal to or higher than the predetermined threshold level;

a first adaptive filter for producing a third voice band signal based on said received voice signal and first tap coefficients and for updating said first tap coefficients based on said first voice band signal and an error signal when said control signal indicates that said received voice signal is higher than the threshold value;

a first subtracter for subtracting said third voice band signal from said first voice band signal to produce said error signal;

a second adaptive filter for producing said estimated background noise based on said second voice band signal and second tap coefficients and for updating said second tap coefficients when said control signal indicates that said received voice signal is lower than said threshold value; and a second subtracter for subtracting said estimated background noise from said received voice signal to produce said first voice signal.

2. The telephone set as claimed in claim 1, wherein said first microphone is provided on a concentric axis of said receiver or speaker.

3. The telephone set as claimed in claim 2, wherein said second microphone is a transmission microphone.

* * * * *